A. PAUL.
DEMOUNTABLE TIRE RIM.
APPLICATION FILED OCT. 30, 1908.
968,880.
Patented Aug. 30, 1910.
2 SHEETS—SHEET 1.
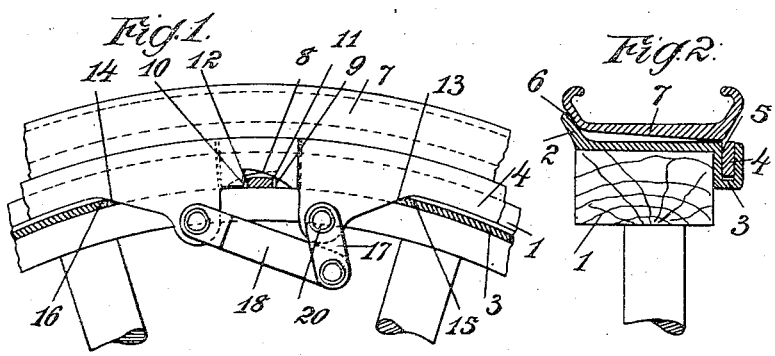
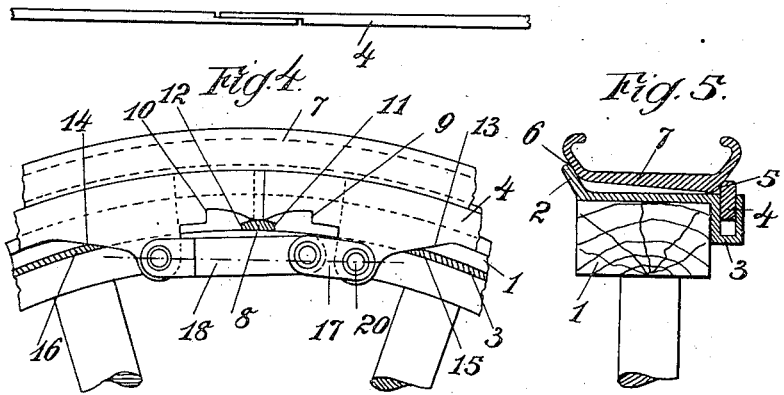
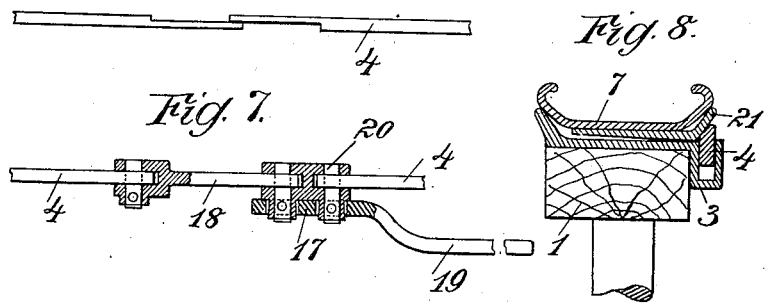

A. PAUL.
DEMOUNTABLE TIRE RIM.
APPLICATION FILED OCT. 30, 1908.
968,880.
Patented Aug. 30, 1910.
2 SHEETS—SHEET 2.
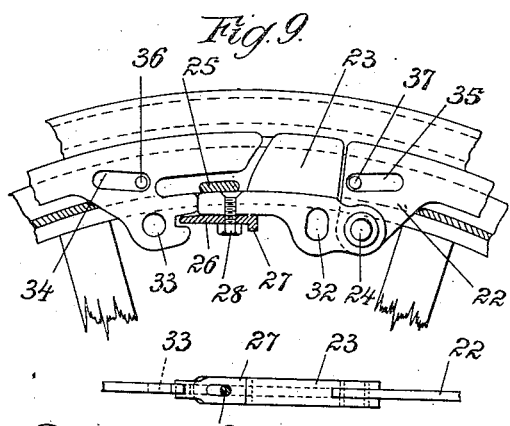
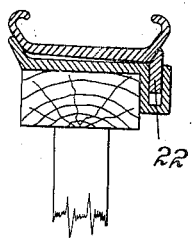
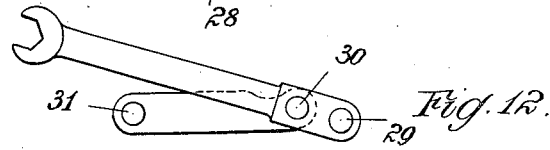
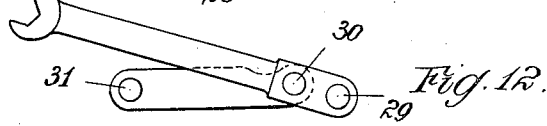
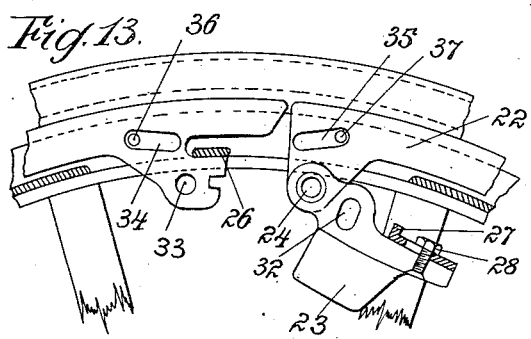
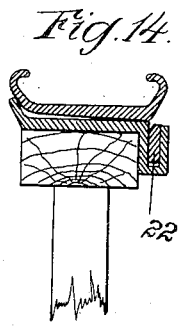
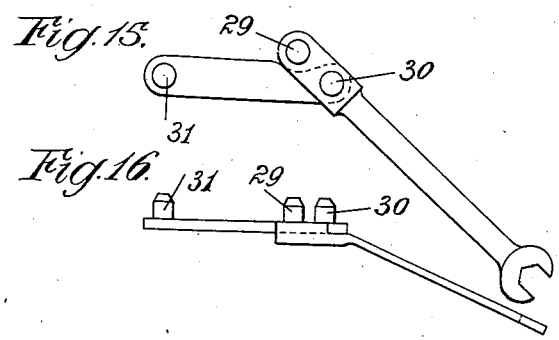
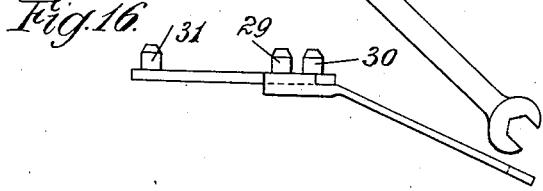
Witnesses:-
Henry Thieme.
F. George Barry.
Inventor:-
Adam Paul
by his attorneys

UNITED STATES PATENT OFFICE.

ADAM PAUL, OF FRANKFORT-ON-THE-MAIN, GERMANY, ASSIGNOR TO CORPORATION OF ADLERWERKE VORM. HEINRICH KLEYER AKTIENGESELLSCHAFT, OF FRANKFORT-ON-THE-MAIN, GERMANY.

DEMOUNTABLE TIRE-RIM.

968,880.           Specification of Letters Patent.     Patented Aug. 30, 1910.

Application filed October 30, 1908. Serial No. 460,283.

*To all whom it may concern:*

Be it known that I, ADAM PAUL, manager, a subject of the German Emperor, and resident of Kettenhofweg No. 111, Frankfort-on-the-Main, Germany, have invented new and useful Improvements in Demountable Tire-Rims, of which the following is a specification.

The present invention relates to demountable tire rims and has for its object to render the rim demountable by the movement of a handle, while it is nevertheless normally held securely in place.

According to the present invention this object is attained by holding the tire rim by means of two wedge-shaped surfaces, one of which surfaces is formed on the usual clamping ring provided at one side of the wheel and guided in a corresponding ring groove. The clamping ring can be easily contracted and released by means of a handle through a locking device comprising toggle links, the end positions of which are automatically secured. To simplify this construction, according to the present invention the locking members on the felly itself are dispensed with, so that fewer parts are mounted on the wheel and the appearance of the wheel is improved accordingly. In order to hold the ends of the clamping ring in the expanded position, a filling piece is swung between them and secured in its filling or clamping position by means of a bolt. Toward the outside, this filling piece is flush with the circumference of the clamping ring, so that dust and dirt cannot penetrate into the lock, a defect which cannot be prevented in other locks.

The swinging in and out of position of the filling piece is effected by a suitable tool; preferably a key comprising a pair of toggle links and provided with engaging pivots is used. This has the advantage that the ends of the clamping ring are first somewhat moved apart when the toggle links arrive at the dead point, thus facilitating the swinging in and out of the filling piece.

The invention will be described with reference to the accompanying drawings wherein—

Figures 1, 2 and 3 show the clamping ring in the contracted or inoperative position, Fig. 1 being a side view partly in section, Fig. 2 a cross section, and Fig. 3 a longitudinal section through the clamping ring. Figs. 4 to 7 show the tire rim with the clamping ring released, *i. e.* in operative position, Fig. 4 being a side view, Fig. 5 a cross section, Fig. 6 a longitudinal section through the clamping ring, and Fig. 7 a longitudinal section through the clamping device. Fig. 8 shows in cross section a modification of the invention, as employed in combination with the usual clencher tire rim. Figs. 9 to 16 show a modification of the invention wherein Figs. 9 to 12 show the construction with the clamping ring in its expanded or operative position, Fig. 9 is a side view partly in section; Fig. 10 a cross section; and Fig. 11 a plan of the locking device seen from below; Fig. 12 shows in side elevation the position of the key after the clamping ring has been expanded; Fig. 13 is a side view partly in section, showing the clamping ring in its contracted position; Fig. 14 is a cross section corresponding to Fig. 10 but showing the clamping ring in its contracted position; Figs. 15 and 16 show in side elevation and plan the position of the key after the contraction of the clamping ring has been effected.

In the arrangement shown in Figs. 1 to 8, on the wooden felly 1 is fixed a rim 2 which is provided at one side with a groove 3 in which the clamping ring 4 is received. This clamping ring is provided at the inner side with an inclined conical surface 5 which presses against the corresponding conical surface of the removable rim 7 so that the latter is centered between the wedge-shaped surfaces 5 and 6 and firmly held therein. When the diameter of the clamping ring 4 is decreased by contracting the ring, as shown in Figs. 1 and 2, the removable rim can be drawn off from the felly over the ring 4.

In the construction shown, the peculiarly profiled ends of the clamping ring overlap each other and are guided on a rib 8 extending across the bottom of the groove 3 in the rim 2 in such manner that the end position of the clamping ring when contracted is fixed by contact of the edges 9 and 11 and 10 and 12 respectively. Simultaneously the lower edges 13 and 14 of the clamping ring are guided on correspondingly shaped inclined surfaces 15 and 16 on the bottom of the grooved rim for the purpose of insuring a smooth opening movement of the clamping ring and at the same time preventing dust from entering the groove, and further obviating twisting of the clamping ring. The lock is formed by a lever 17 and a link 18. By turning a lever 19 engaging both pivots of the lever 17 the latter swings around the pivot 20 until it has passed the dead point (shown in dotted lines) and is held in the end position by contacting with the rim 2. During this operation the ends of the clamping ring slide on to the highest points 11, and 12, of the rib 8, whereby the end position is also secured. For contracting the clamping ring so as to be able to remove the rim 7 the lever 17 is swung back around its pivot by means of the handle 19 into the position shown in Fig. 1 until the edges 9 and 10 lie again against the edges 11, 12 respectively.

For carrying out the invention a specially constructed removable rim as shown in Fig. 2 may be employed, wherein the rim is somewhat thicker on the one side, so that on this side it contacts with the fixed rim 2. Any removable rim of usual construction may, however, be used, but in the latter case an additional angle iron 21 has to be employed, as shown in Fig. 8.

In the modification shown in Figs. 9 to 16 at one end of the clamping ring 22 a filling piece 23 is pivoted on a hollow pivot 24. This filling piece in its operative position engages with the rib 25 across the bottom of the guide groove and with the surface 26 on the other end of the clamping ring. In this position the arrangement is secured by the tension of the ring and by a bolt 27, held in position by a screw 28.

For contracting the ring, when detaching the removable rim, the bolt 27 is retracted and the key consisting of two levers (Fig. 12) is adjusted with its pivots 29, 30, 31 in the corresponding pivot holes 24, 32, 33, whereupon the outer end of the key is swung toward the center of the wheel. In this movement the toggle lever first passes through the dead point position, whereby the distance between the pivots 24, 33 is somewhat increased and a space is formed, into which the filling piece can easily be swung.

The hole 32 is formed as a slot in order that the toggle levers may first be brought into the dead point position without carrying with them the filling piece.

The simultaneous opening and closing of both ends of the clamping ring is secured by means of guide slots 34 and 35 engaging with guide pins 36 and 37. If one end of the clamping ring has been moved so far inward or outward that one of the guide pins 36 and 37 comes in contact with the corresponding end of the slots 34 or 35, then on further movement this end will be held fast and the other end of the clamping ring can be positively moved.

Instead of the toggle link key above described, any other well known or suitable tool may be employed for operating the toggle or filling piece.

Now what I claim and desire to secure by Letters Patent is the following:

1. In a wheel, the combination with an annular fixed member provided with an annular groove at one edge and an annular abutment at the opposite edge, of a demountable rim constructed to be mounted on the said fixed annular member, an expansible and contractible ring seated in the said groove, the said demountable rim and the said ring having beveled faces and means for expanding the said ring and thereby by the radial outward movement of the said ring, producing a wedge action on the rim to lock it in position and close the joints between the outer wall of the groove and the ring and between the rim and the ring and also between the rim and the abutment.

2. In a wheel, the combination with an annular fixed member provided with an annular groove at one edge and an annular inclined faced abutment at the opposite edge, of a demountable rim constructed to seat on the said fixed annular member, an expansible and contractible ring seated in the said groove, the said demountable rim and the said ring having beveled faces in position to engage and means for expanding said ring and thereby by the radial outward movement of the said ring, producing a wedge action on the rim to lock it in position and close the joints between the outer wall of the groove and the ring and between the rim and the ring and also between the rim and the abutment.

3. In a wheel, the combination with an annular fixed member provided with a groove at its side and a rib across said groove and a demountable rim seated on the said fixed member, of a clamping ring seated in the groove, an end of the clamping ring being located in position to abut against the said rib and means for expanding said clamping ring.

4. In a wheel, the combination with an annular fixed member provided with a groove at its side, the bottom of the groove being provided with a slot having inclined edges and a demountable rim seated on the said fixed member, of a clamping ring seated in the said groove and provided with inclined surfaces for engaging the inclined edges of the slot in the bottom of the groove and means for expanding the clamping ring.

5. In a wheel, the combination with a fixed annular member provided with a groove at its side and a demountable rim seated on the said fixed member and provided with an inclined surface at its edge, of a clamping ring seated in the said groove and bearing against the inclined surface at the edge of the demountable rim, means for expanding the said clamping ring and a filling piece pivotally secured to one end only of the said clamping ring and adapted to be swung into position between the ends of the clamping ring when the latter is expanded.

In testimony, that I claim the foregoing as my invention, I have signed my name in presence of two witnesses, this twenty-first day of October 1908.

ADAM PAUL.

Witnesses:
 NATHAN STERN,
 JEAN GRUND.